US010084681B2

United States Patent
Xu et al.

(10) Patent No.: US 10,084,681 B2
(45) Date of Patent: Sep. 25, 2018

(54) METHOD AND SYSTEM FOR MONITORING SERVER CLUSTER

(71) Applicants: BOE TECHNOLOGY GROUP CO., LTD., Beijing (CN); BEIJING BOE DISPLAY TECHNOLOGY CO., LTD., Beijing (CN)

(72) Inventors: Baolong Xu, Beijing (CN); Yong Jiang, Beijing (CN); Yu Feng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 73 days.

(21) Appl. No.: 14/436,735

(22) PCT Filed: Sep. 11, 2014

(86) PCT No.: PCT/CN2014/086308
§ 371 (c)(1),
(2) Date: Apr. 17, 2015

(87) PCT Pub. No.: WO2015/180291
PCT Pub. Date: Dec. 3, 2015

(65) Prior Publication Data
US 2016/0294666 A1  Oct. 6, 2016

(30) Foreign Application Priority Data
May 30, 2014 (CN) .......................... 2014 1 0240983

(51) Int. Cl.
*G06F 15/173* (2006.01)
*H04L 12/26* (2006.01)
(Continued)

(52) U.S. Cl.
CPC .............. *H04L 43/14* (2013.01); *H04L 29/08* (2013.01); *H04L 41/147* (2013.01); *H04L 43/08* (2013.01); *H04L 43/16* (2013.01)

(58) Field of Classification Search
None
See application file for complete search history.

(56) References Cited

U.S. PATENT DOCUMENTS

| 6,148,335 A * | 11/2000 | Haggard ............. H04L 12/2602 709/224 |
| 8,024,712 B1 * | 9/2011 | Korolev ............... G06F 11/3476 717/127 |
| 2009/0063509 A1 | 3/2009 | Lockhart et al. |
| 2009/0077257 A1 * | 3/2009 | Savoor ................ H04L 41/0681 709/232 |

(Continued)

FOREIGN PATENT DOCUMENTS

| CN | 101123616 A | 2/2008 |
| CN | 101312580 A | 11/2008 |

(Continued)

OTHER PUBLICATIONS

International Search Report dated Feb. 11, 2015; PCT/CN2014/086308.

(Continued)

*Primary Examiner* — Joshua Joo
(74) *Attorney, Agent, or Firm* — Ladas & Parry LLP

(57) ABSTRACT

A method and system for monitoring a server cluster are provided for solving the problem of incapable of performing unified management and monitoring of different types of servers in the prior art. The method comprises: obtaining monitoring information inputted by a user and related to a server that needs to be monitored, the monitoring information comprising server identification information of the server that needs to be monitored and monitoring contents; determining a scripting language corresponding to the server based on a correspondence between server identification information and scripting languages; generating, based on (Continued)

the obtained monitoring contents, a monitoring command by using the scripting language corresponding to the server, to instruct the server to return corresponding data information according to the monitoring contents; sending the monitoring command to the server, and receiving a response message returned by the server, the response message carrying the data information obtained by the server based on the monitoring command. The method and system realize management and monitoring of different types of servers.

15 Claims, 1 Drawing Sheet

(51) Int. Cl.
*H04L 29/08* (2006.01)
*H04L 12/24* (2006.01)

(56) References Cited

U.S. PATENT DOCUMENTS

| | | | | |
|---|---|---|---|---|
| 2011/0078108 | A1* | 3/2011 | Kumar | G06F 11/3495 707/602 |
| 2013/0268639 | A1* | 10/2013 | Myrah | G06F 8/76 709/221 |
| 2015/0127760 | A1* | 5/2015 | Hsieh | H04L 43/026 709/207 |

FOREIGN PATENT DOCUMENTS

| | | |
|---|---|---|
| CN | 101877618 A | 11/2010 |
| CN | 102394901 A | 3/2012 |
| CN | 102655519 A | 9/2012 |
| CN | 103051496 A | 4/2013 |
| CN | 103136081 A | 6/2013 |
| CN | 103150241 A | 6/2013 |
| CN | 103595804 A | 2/2014 |
| CN | 103677918 A | 3/2014 |
| CN | 104022902 A | 9/2014 |

OTHER PUBLICATIONS

Written Opinion of the International Searching Authority dated Feb. 11, 2015; PCT/CN2014/086308.
Second Chinese Office Acton dated Jan. 17, 2017; Appln. No. 201410240983.6.
Dong Bo; "Research on Method and Implementation of Monitor and Management for Cloud Computing Cluster Server System", China Master's Thesis Full-Text Database Electronic Journals; Jan. 15, 2014; pp. 1139-1126.
First Chinese Office Action dated Oct. 27, 2016; Appln. No. 201410240983.6.
Third Chinese Office Action dated Apr. 20, 2017; Appln. No. 201410240983.6.

* cited by examiner

METHOD AND SYSTEM FOR MONITORING SERVER CLUSTER

TECHNICAL FIELD OF THE DISCLOSURE

The present disclosure relates to the field of network communication technology, and in particular, to a method and system for monitoring a server cluster.

BACKGROUND

With the rapid development of the information technology, companies use servers more frequently to manage company resources and providing a variety of services to users. Servers are usually divided into file servers, database servers, and application servers and so on. At present, the type and number of servers used inside the companies are getting more and more, so as to meet the requirement of normal company operations. The management and monitoring of large number and variety of servers have become the business focus of company system administrators.

Server monitoring refers to recording, by a variety of ways, of data obtained through the running of remote servers as monitoring records, and calling the monitoring records for viewing at any time when needed. Faced with dozens or even hundreds of servers and various application information on the server, it is difficult for the system administrator to realize comprehensive and real-time monitoring. Therefore, there is a need for an automated monitoring software to perform a unified management and monitoring on a large number of servers and the various application softwares running on the servers, so as to realize comprehensive and real-time monitoring.

Current monitoring softwares are all customized by the server manufacturers for their own made servers, and can not perform monitoring on different types of servers. However, companies will generally purchase different types of servers based on their own needs, and as the monitoring softwares for different types of servers are relatively independent, the companies have to monitor a type of servers by use a monitoring software corresponding to that type of servers, and are unable to perform unified monitoring and management on different types of servers.

Based on the existing monitoring softwares, if one wants to realize management on different types of servers, the management of different types of servers has to be realized by firstly realizing monitoring of every type of servers through monitoring softwares corresponding to that respective type of servers, then collecting statistics of data obtained through monitoring different types of servers by system administrators. But this way is of low processing efficiency and error-prone.

SUMMARY

Embodiments of the present disclosure provide a method and system for monitoring a server cluster, which are used to solve the existing problems of low processing efficiency and error-prone when managing different types of servers.

An embodiment of the present disclosure provides a method for monitoring a server cluster, the method comprising:

obtaining monitoring information inputted by a user and related to a server that needs to be monitored, the monitoring information comprising server identification information of the server that needs to be monitored and monitoring contents;

determining a scripting language corresponding to the server based on a correspondence between server identification information and scripting languages;

generating, based on the obtained monitoring contents, a monitoring command by using the scripting language corresponding to the server, to instruct the server to return corresponding data information according to the monitoring contents;

sending the monitoring command to the server, and receiving a response message returned by the server, the response message carrying the data information obtained by the server based on the monitoring command.

Optionally, the monitoring information further comprises monitoring time and a sending frequency, and sending the monitoring command to the server comprises:

sending the monitoring command to the server periodically according to the sending frequency during the monitoring time.

Optionally, after receiving the response message returned by the server, the method further comprises:

extracting all the data information from the received response message;

generating and saving data information list based on the extracted data information, the data information list corresponding to the server identification information and comprising data names and their corresponding data information.

Optionally, after generating the data information list, the method further comprises:

for each piece of data information in the data information list, comparing the piece of data information with a set threshold range;

alarming when the piece of data information exceeds the threshold range, and informing the user of the piece of data information, corresponding data name and corresponding server identification information.

Optionally, after generating the data information list, the method further comprises:

analyzing all pieces of data information corresponding to a same data name saved in the data information list to determine the changing trend of all the pieces of data information corresponding to the data name;

predicting data information to be returned next time by the server based on the determined change trend;

alarming when it is predicted that the data information to be returned next time by the server will exceed the set threshold range, and informing the user of the analysis result and corresponding server identification information.

Optionally, the method further comprises:

receiving an update command sent from the user, and updating the correspondence between server identification information and scripting languages based on server identification information and scripting languages carried in the update command.

An embodiment of the present disclosure provides a system for monitoring a server cluster, the system comprising:

an obtaining unit, configured to obtain monitoring information inputted by a user and related to a server that needs to be monitored, the monitoring information comprising server identification information of the server that needs to be monitored and monitoring contents;

a processing unit, configured to determine a scripting language corresponding to the server based on a correspondence between server identification information and scripting languages; and generate, based on the obtained monitoring contents, a monitoring command by using the scripting language corresponding to the server, to instruct the server to return corresponding data information according to the monitoring contents;

a communication unit, configured to send the monitoring command to the server, and receive a response message returned by the server, the response message carrying the data information obtained by the server based on the monitoring command.

Optionally, the monitoring information further comprises monitoring time and a sending frequency, and the communication unit is specifically configured to:

send the monitoring command to the server periodically according to the sending frequency during the monitoring time.

Optionally, the processing unit is further configured to:

extract all the data information from the response message received by the communication unit; generate and save a data information list based on the extracted data information, the data information list corresponding to the server identification information and comprising data names and their corresponding data information.

Optionally, the processing unit is further configured to:

for each piece of data information in the data information list, compare the piece of data information with a set threshold range; alarm when the piece of data information exceeds the threshold range, and inform the user of the piece of data information, corresponding data name and corresponding server identification information.

Optionally, the processing unit is further configured to:

analyze all pieces of data information corresponding to a same data name saved in the data information list to determine the change trend of all the pieces of data information corresponding to the data name; predict data information to be returned next time by the server based on the determined change trend; and alarm when it is predicted that the data information to be returned next time by the server will exceed the set threshold range, and inform the user of the analysis result and corresponding server identification information.

Optionally, the communication unit is further configured to receive an update command sent from the user.

The processing unit is further configured to update the correspondence between the server identification information and scripting languages based on server identification information and scripting languages carried in the update command.

In the method and system provided in the embodiments of the present disclosure, a scripting language corresponding to a server that needs to be monitored is determined based on a correspondence between server identification information and scripting languages, after obtaining monitoring information inputted by a user. A monitoring command that can be identified by the server is generated using the scripting language corresponding to the server based on the obtained monitoring contents, to instruct the server to return corresponding data information according to the monitoring contents. The monitoring command is sent to the server and a response message returned by the server is received, the response message carrying the data information obtained by the server based on the monitoring command. For different types of servers, a monitoring command which can be identified by a server is generated using a scripting language corresponding to the server, therefore, the monitoring and management of different types of servers are achieved. The solutions provided by embodiments of the present disclosure may provide fast processing speed, high efficiency and accuracy.

DETAILED DESCRIPTION

For different types of servers, the present disclosure uses a scripting language corresponding to a server to generate a monitoring command which can be identified by the server, therefore, the monitoring and management of different types of servers are realized.

In the following, embodiments of the present disclosure are further described in detail in connection with figures. It should be understood that the described embodiments are only for illustrating and explaining the present disclosure, but not for limiting the present disclosure.

Figure 1:
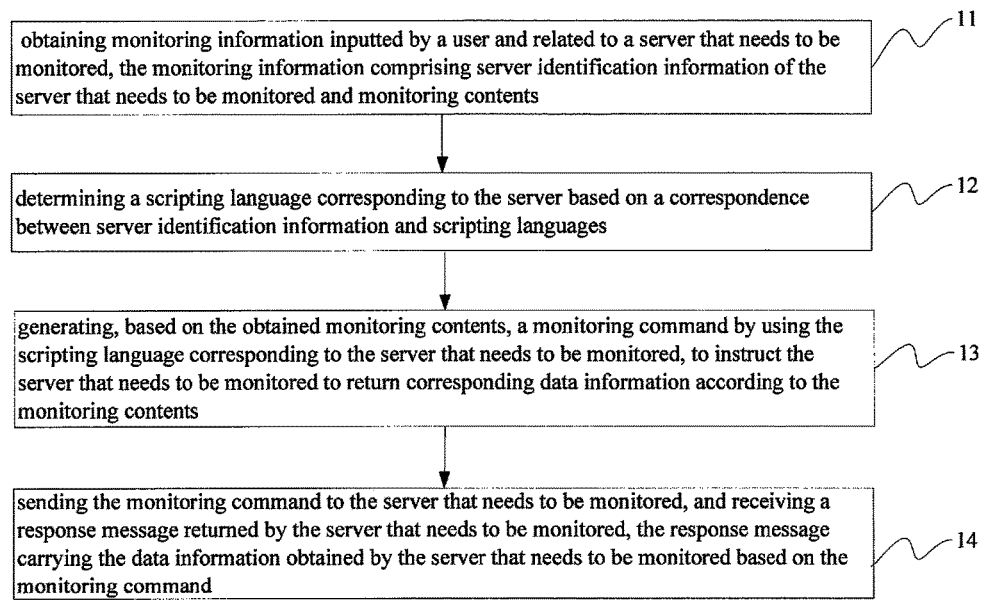
FIG. 1 is a schematic flow chart of a method for monitoring a server cluster provided by an embodiment of the present disclosure.

As shown in FIG. 1, an embodiment of the present disclosure provides a method for monitoring a server cluster, the method comprises the following steps.

Step 11: monitoring information inputted by a user and related to a server that needs to be monitored is obtained, the monitoring information comprising server identification information of the server that needs to be monitored and monitoring contents.

The monitoring contents comprises CPU monitoring, memory monitoring, disk monitoring and the monitoring of system index such as network information.

The server that needs to be monitored can be a HP Unix server, a HP Windows NT server, an IBM AIX server, an IBM Windows NT server, a SUN Switch and various types of PC, and so on.

Step 12: a scripting language corresponding to the server that needs to be monitored is determined based on a correspondence between server identification information and scripting languages.

Step 13: a monitoring command is generating, based on the obtained monitoring contents, by using the scripting language corresponding to the server that needs to be monitored, to instruct the server that needs to be monitored to return corresponding data information according to the monitoring contents.

Step 14: the monitoring command is send to the server that needs to be monitored, and a response message returned by the server that needs to be monitored is received, the response message carrying the data information obtained by the server that needs to be monitored based on the monitoring command.

In the embodiment of the present disclosure, for different types of servers, a monitoring command which can be identified by a server is generated using a scripting language corresponding to the server, therefore, the monitoring and management of different types of servers are realized. The solutions provided by embodiments of the present disclosure may provide fast processing speed, high efficiency and accuracy.

In an implementation, the monitoring command generated using the scripting language is generally a character string for indicating the monitoring contents returned by the server that needs to be monitored and the format to be used when returning the data information. For example, a generated monitoring command is as follows:

bdf | sed -n '2,$'p |awk 'NF==1 {printf $1;next} {print}' |awk -F'"'{printf "% s % s\n",$6,$5}';

The above monitoring command is used to obtain the space utilization ratio of respective file systems of the server. The "bdf" in the above monitoring command represents obtaining the space utilization ratio of respective file systems of the server, other character strings except the "bdf" in the monitoring command represent the format to be used when returning the data information.

If the server only performs the "bdf" sub-command in the above monitoring command, the returned response message is of the following format:

| Filesystem | kbytes | used | avail | % used | Mounted on; |
|---|---|---|---|---|---|
| /dev/vg00/lvol3 | 1048576 | 1020832 | 27600 | 97% | /; |
| /dev/vg00/lvol1 | 1835008 | 183144 | 1639048 | 10% | /stand; |
| /dev/vg00/lvol8 | 62914560 | 1375416 | 61058896 | 2% | /var; |
| ... | | | | | |

Wherein, parameter "Filesystem" represents the name of the logical volume(i.e., file); parameter "Kbytes" represents the total memory size of the file with a unit of KB; parameter "used" represents the already used memory size of the file with a unit of KB; parameter "avail" represents the available memory size of the file with a unit of KB; parameter "% used" represents the utilization ratio of the file, that is, a percentage covered by the already used memory size in the total memory size; parameter "Mounted on" represents the name of the mounted file system.

If the server performs the above complete monitoring command, the returned response message is of the following format:

```
/ 97%;
/stand 10%;
/var 2%;
...
```

In an implementation, sending the generated monitoring command to the server that needs to be monitored in step 14 comprises: using Telnet protocol or SSH protocol to send the monitoring command to the server; and receiving a response message returned by the server that needs to be monitored comprises using Telnet protocol or SSH protocol to receive a response message returned by the server.

The Telnet protocol is a member of the TCP/IP protocol stack, and is a standard protocol and main manner for the Internet remote log-in service. Almost all servers would conform to that protocol. SSH is a relatively reliable protocol, which dedicated to providing security for remote log-in session and other network services at present.

Optionally, the monitoring information inputted by a user further comprises monitoring time. The monitoring information is used to indicate a time range in which the server needs to be monitored. The monitoring time comprises a start time of the monitoring and an end time of the monitoring, or the monitoring time comprises the start time of the monitoring and a duration of the monitoring.

In an implementation, if the monitoring information further comprises monitoring time, then in step 14, the monitoring command generated in step 13 is sent to the server that needs to be monitored and the response message returned by the server that needs to be monitored is received during the monitoring time.

Optionally, the monitoring information inputted by a user further comprises a monitoring frequency.

The monitoring frequency can be time information, an interval between two adjacent sending of the monitoring command, such as sending a monitoring command every 1 hour. The monitoring frequency can also be information regarding times, that is, the times that a monitoring command needs to be sent within the monitoring time, for example, a monitoring command needs to be sent 10 times within the monitoring time. The embodiments of the present disclosure do not limit the implementation of monitoring frequency.

In an implementation, if the monitoring information comprises monitoring time and a sending frequency, then step 14 further comprises: sending the monitoring command to the server that needs to be monitored periodically according to the sending frequency comprised in the monitoring information during the monitoring time.

Based on any one of the above implementations, in an embodiment, after step 14, the method further comprises:

extracting all the data information from the received response message;

generating and saving a data information list based on the extracted data information, the data information list corresponding to the server identification information of the server that needs to be monitored and comprising data names (Name) and their corresponding data information (Value).

For example, the received response message is filtered using a regular expression technology, thereby obtaining useful information (that is, all data information returned by the server according to monitoring contents). The regular expression technology is a data processing manner that can be supported by programming languages of JAVA, C++, Perl, etc. and scripting languages. The respective filtered data information is matched through a data capture rule corresponding to the monitoring command to generate a data information list comprising data names and their corresponding data information. The list and the server identification information of the server sending the data information are bound.

Optionally, the data information list further comprises a time at which respective data information is received.

Optionally, after generating the data information list, the data information list is saved in a database. A connection to the database can adopt database connection technologies such as ODBC, JBDC, etc. and also a database connection pool is adopted, such that the connections in the connection pool can be effectively and securely reused, avoiding the overhead of frequent establishment and closure of database connections.

Further, as an optional processing manner, after generating the data information list, the method further comprises:

for each piece of data information in the data information list, comparing the piece of data information with a set threshold range;

alarming when the piece of data information exceeds the threshold range, and informing the user of the piece of data information, corresponding data name and corresponding server identification information.

For example, the type of the data information is classified into two categories, a value domain type and a fluctuating type. The value domain type represents that the data information is a value almost linearly increasing or decreasing in the server. The value domain type further includes a numeric value type and a character string type. For data information of the numeric value type, when it is processed, the data values are compared, and for data information of the character string type, when it is processed, the contents of character strings are compared to determine whether they are the same. Alarming is needed once the value domain type exceeds a set threshold range, so as to enable the user to solve the problem in time, thereby achieving the purpose of locating and solving a problem in a timely manner once it occurs.

The fluctuating type represents that the data information shows as a fluctuating value in the server. The times that it exceeds a set threshold range within a set time is used as a standard for determining whether to alarm. For data information of the fluctuating type, it is determined whether the times that it exceeds a set threshold range within a set time has reached the upper limit, if so, then alarm.

In an implementation, for each piece of data information in the data information list, the type of the piece of data information is determined before performing an alarm process for said piece of data information. If it is determined the data information is of the value domain type, alarm when the data information exceeds a set threshold range; and if is determined the data information is of the fluctuating type, then it is determined whether the times that it exceeds a set threshold range within a set time has reached the upper limit, if so, then alarm.

Optionally, a list of free test data may be set, and there is no need to perform an alarm test for the data information corresponding to the data names in the list of free test data. In an implementation, for each piece of data information in the data information list, it is determined whether the data name corresponding to the piece of data information is included in the list of free test data before performing the alarm process on said piece of data information; if so, then there is no need to perform the alarm test for said piece of data information, and if not, then the type of said piece of data information is determined to further determine whether the alarming is needed.

As an optional processing manner, after generating the data information list, the method further comprises:

analyzing all pieces of data information corresponding to a same data name saved in the data information list to determine a change trend of all the pieces of data information corresponding to the data name;

predicting data information to be returned next time by the server that needs to be monitored based on the determined change trend;

alarming when it is predicted that the data information to be returned next time by the server will exceed the set threshold range, and informing the user of the analysis result and corresponding server identification information.

Specifically, in said optional processing method, early warning is performed based on the historical data information returned by the server, so as to achieving an effect of predicting the occurrence of a problem and solving the problem in a timely manner before it happens.

Based on any one of the above embodiments, in an implementation, optionally, the way to alarm includes: alarming via mail, alarming through UI, or alarming through voice.

Based on any one of the above embodiments, the method further comprises:

receiving an update command sent from the user, and updating the correspondence between server identification information and scripting languages based on server identification information and scripting languages carried in the update command.

The above processing procedure can be realized by using a software program which may be stored in a storage medium, and the above steps of the method are performed when the stored software program is invoked.

Figure 2:
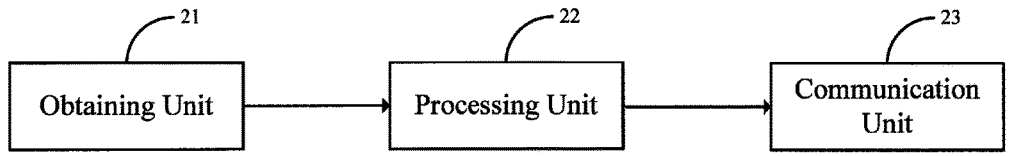
FIG. 2 is a schematic diagram of a system for monitoring a server cluster provided by an embodiment of the present disclosure.

Based on the same inventive concept, an embodiment of the present disclosure provides a system for monitoring a server cluster. As shown in FIG. 2, the system comprises:

an obtaining unit 21, configured to obtain monitoring information inputted by a user and related to a server that needs to be monitored, the monitoring information comprising server identification information of the server that needs to be monitored and monitoring contents;

a processing unit 22, configured to determine a scripting language corresponding to the server that needs to be monitored based on a correspondence between server identification information and scripting languages; and generate, based on the obtained monitoring contents, a monitoring command by using the scripting language corresponding to the server, to instruct the server to return corresponding data information according to the monitoring contents;

a communication unit 23, configured to send the monitoring command to the server, and receive a response message returned by the server, the response message carrying the data information obtained by the server based on the monitoring command.

Optionally, the monitoring information further comprises monitoring time and a sending frequency, and in an implementation, the communication unit 23 is specifically configured to:

send the monitoring command generated by the processing unit 22 to the server that needs to be monitored periodically according to the sending frequency during the monitoring time.

Based on any one of the above embodiments, the communication unit 23 is specifically configured to:

send the monitoring command to the server that needs to be monitored using Telnet protocol or SSH protocol; and receive a response message returned by the server using Telnet protocol or SSH protocol.

Based on any one of the above embodiments, in an implementation, the processing unit 22 is further configured to:

extract all the data information from the response message received by the communication unit 23; generate and save a data information list based on the extracted data information, the data information list corresponding to the server identification information of the server that needs to be monitored and comprising data names and their corresponding data information.

Further, as an optional processing manner, the processing unit 22 is further configured to:

for each piece of data information in the data information list, compare the piece of data information with a set threshold range; alarm when the piece of data information exceeds the threshold range, and inform the user of the piece of data information, corresponding data name and corresponding server identification information.

As another optional processing manner, the processing unit 22 is further configured to:

analyze all pieces of data information corresponding to a same data name saved in the data information list to determine a change trend of all the pieces of data information corresponding to the data name; predict data information to be returned next time by the server that needs to be monitored based on the determined change trend; and alarm when it is predicted that the data information to be returned next time by the server will exceed the set threshold range, and inform the user of the analysis result and corresponding server identification information.

Based on any one of the above embodiments, the communication unit 23 is further configured to receive an update command sent from the user.

The processing unit 22 is further configured to: update the correspondence between the server identification information and scripting languages based on the server identification information and scripting languages carried in the update command.

Those skilled in the art should understand that embodiments of the present disclosure may be provided as a method, system, or computer program product. Accordingly, the present disclosure may adopt implementation forms of an entire hardware, an entire software, or a combination of software and hardware. Furthermore, the present disclosure may adopt the form of a computer program product implemented on one or more computer-usable storage media (including, but not limited to, disk storage, CD-ROM, optical memory, etc.) comprising computer-usable program codes therein.

The present disclosure is described by referring to the flowcharts and/or block diagrams of the method, devices (systems) and computer program products according to the embodiments of the present disclosure. It should be understood that every process and/or block in the flowcharts and/or block diagrams and a combination of the processes and/or blocks in the flowcharts and/or block diagrams can be realized by computer program instructions. These computer program instructions may be provided to a general purpose computer, a special purpose computer, a embedded processor or a processor of other programmable data processing devices to produce a machine, such that the instructions executed by a computer or a processor of other programmable data processing devices generate means for realizing the functions specified in one process or multiple processes of the flowcharts and/or in one block or multiple blocks of the block diagrams.

These computer program instructions may also be stored in a computer-readable memory which can instruct a computer or other programmable data processing devices to operate in a particular way, such that the instructions stored in the computer-readable memory generate manufacture products including instruction means which realize the functions specified in one process or multiple processes of the flowcharts and/or in one block or multiple blocks of the block diagrams.

These computer program instructions may also be loaded onto a computer or other programmable data processing devices, such that a series of steps are implemented on the computer or other programmable devices to generate a computer implemented process, thereby the instructions executed on a computer or other programmable devices provide steps for realizing the functions specified in one process or multiple processes of the flowcharts and/or in one block or multiple blocks of the block diagrams.

Although preferred embodiments of the present disclosure have been described, one skilled in the art may make additional changes and modifications once the basic inventive concepts are known. Therefore, the appended claims are intended to include the preferred embodiments and all the changes and modifications that fall within the scope of the present disclosure.

Obviously, those skilled in the art may make various modifications and variations to the present disclosure without departing from the spirit and scope of the present disclosure. As such, if such modifications and variations of the present disclosure belong to the technical scope of the claim of the present disclosure and their equivalents, these modifications and variations are also intended to be incorporated within the protection scope of the present disclosure.

The present application claims the priority of Chinese Patent Application No. 201410240983.6 filed on May 30, 2014, entire content of which is incorporated as part of the present invention by reference.

What is claimed is:

1. A method for monitoring a server cluster, comprising:
obtaining monitoring information inputted by a user and related to a server in the server cluster that needs to be monitored, the monitoring information comprising server identification information of the server that needs to be monitored and monitoring contents, the server cluster including different types of servers corresponding to different scripting languages;
determining a scripting language corresponding to the server according to the server identification information based on a correspondence between server identification information and scripting languages;
generating, based on the obtained monitoring information, a monitoring command by using the scripting language corresponding to the server, to instruct the server to return corresponding data information according to the monitoring contents;
sending the monitoring command to the server, and receiving a response message returned by the server, the response message carrying the data information obtained by the server based on the monitoring command; and
receiving an update command sent from the user, and updating the correspondence between the server identification information and the scripting languages based on server identification information and scripting languages carried in the update command.

2. The method according to claim 1, wherein the monitoring information further comprises monitoring time and a sending frequency, and
sending the monitoring command to the server comprises:
sending the monitoring command to the server periodically according to the sending frequency during the monitoring time.

3. The method according to claim 1, after receiving the response message returned by the server, further comprising:
extracting all the data information from the received response message;
generating and saving a data information list based on the extracted data information, the data information list corresponding to the server identification information and comprising data names and data information corresponding to the data names.

4. The method according to claim 3, after generating the data information list, further comprising:
for each piece of data information in the data information list, comparing the piece of data information with a set threshold range;
alarming when the piece of data information exceeds the threshold range, and informing the user of the piece of data information, corresponding data name and corresponding server identification information.

5. The method according to claim 3, after generating the data information list, further comprising:

analyzing all pieces of data information corresponding to a same data name saved in the data information list to determine a change trend of all the pieces of data information corresponding to the data name;

predicting data information to be returned next time by the server based on the determined change trend;

alarming when it is predicted that the data information to be returned next time by the server will exceed a set threshold range, and informing the user of analysis result and corresponding server identification information.

6. A system for monitoring a server cluster, comprising:

an obtaining sub-circuit, configured to obtain monitoring information inputted by a user and related to a server in the server cluster that needs to be monitored, the monitoring information comprising server identification information of the server that needs to be monitored and monitoring contents, the server cluster including different types of servers corresponding to different scripting languages;

a processing sub-circuit, configured to determine a scripting language corresponding to the server according to the server identification information based on a correspondence between server identification information and scripting languages; and generate, based on the obtained monitoring information, a monitoring command by using the scripting language corresponding to the server, to instruct the server to return corresponding data information according to the monitoring contents;

a communication sub-circuit, configured to send the monitoring command to the server, and receive a response message returned by the server, the response message carrying the data information obtained by the server based on the monitoring command;

wherein the communication sub-circuit is further configured to receive an update command sent from the user; and the processing sub-circuit is further configured to update the correspondence between the server identification information and the scripting languages based on the server identification information and scripting languages carried in the update command.

7. The system according to claim 6, wherein the monitoring information further comprises monitoring time and a sending frequency, and the communication sub-circuit is specifically configured to send the monitoring command to the server periodically according to the sending frequency during the monitoring time.

8. The system according to claim 6, wherein the processing sub-circuit is further configured to:

extract all the data information from the response message received by the communication sub-circuit; generate and save a data information list based on the extracted data information, the data information list corresponding to the server identification information and comprising data names and data information corresponding to the data names.

9. The system according to claim 8, wherein the processing sub-circuit is further configured to:

for each piece of data information in the data information list, compare the piece of data information with a set threshold range; alarm when the piece of data information exceeds the threshold range, and inform the user of the piece of data information, corresponding data name and corresponding server identification information.

10. The system according to claim 8, wherein the processing -sub-circuit is further configured to:

analyze all pieces of data information corresponding to a same data name saved in the data information list to determine a change trend of all the pieces of data information corresponding to the data name; predict data information to be returned next time by the server based on the determined change trend; and alarm when it is predicted that the data information to be returned next time by the server will exceed a set threshold range, and inform the user of analysis result and corresponding server identification information.

11. A computer program product for monitoring a server cluster, the computer program product comprising a non-transitory computer readable storage media having computer program instructions stored thereon, wherein the instructions, when executed by one or more processors, cause the processors to perform steps of:

obtaining monitoring information inputted by a user and related to a server in the server cluster that needs to be monitored, the monitoring information comprising server identification information of the server that needs to be monitored and monitoring contents, the server cluster including different types of servers corresponding to different scripting languages;

determining a scripting language corresponding to the server according to the server identification information based on a correspondence between server identification information and scripting languages;

generating, based on the obtained monitoring information, a monitoring command by using the scripting language corresponding to the server, to instruct the server to return corresponding data information according to the monitoring contents;

sending the monitoring command to the server, and receiving a response message returned by the server, the response message carrying the data information obtained by the server based on the monitoring command; and receiving an update command sent from the user, and updating the correspondence between the server identification information and the scripting languages based on server identification information and scripting languages carried in the update command.

12. The computer program product according to claim 11, wherein the monitoring information further comprises monitoring time and a sending frequency, and sending the monitoring command to the server comprises:

sending the monitoring command to the server periodically according to the sending frequency during the monitoring time.

13. The computer program product according to claim 11, wherein the instructions, when executed by one or more processors, further cause the processors to, after receiving the response message returned by the server, perform steps of:

extracting all the data information from the received response message; generating and saving a data information list based on the extracted data information, the data information list corresponding to the server identification information and comprising data names and data information corresponding to the data names.

14. The computer program product according to claim 13, wherein the instructions, when executed by one or more processors, further cause the processors to, after generating the data information list, perform steps of:

for each piece of data information in the data information list, comparing the piece of data information with a set threshold range;

alarming when the piece of data information exceeds the threshold range, and informing the user of the piece of data information, corresponding data name and corresponding server identification information.

15. The computer program product according to claim 13, wherein the instructions, when executed by one or more processors, further cause the processors to, after generating the data information list, perform steps of:

analyzing all pieces of data information corresponding to a same data name saved in the data information list to determine a change trend of all the pieces of data information corresponding to the data name;

predicting data information to be returned next time by the server based on the determined change trend;

alarming when it is predicted that the data information to be returned next time by the server will exceed a set threshold range, and informing the user of analysis result and corresponding server identification information.

* * * * *